US007529293B2

(12) United States Patent
Lochner

(10) Patent No.: US 7,529,293 B2
(45) Date of Patent: May 5, 2009

(54) UNIVERSAL INTELLIGENT MODEM

(75) Inventor: Michael Lochner, Filderstadt (DE)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 12/024,684

(22) Filed: Feb. 1, 2008

(65) Prior Publication Data

US 2008/0212663 A1 Sep. 4, 2008

Related U.S. Application Data

(63) Continuation of application No. 10/320,711, filed on Dec. 17, 2002, now Pat. No. 7,327,781.

(51) Int. Cl.
*H04B 1/38* (2006.01)

(52) U.S. Cl. ...................................................... 375/222

(58) Field of Classification Search ................. 375/222, 375/223; 714/1, 25, 26, 48, 57, 800, 801
See application file for complete search history.

(56) References Cited

U.S. PATENT DOCUMENTS

| | | | | |
|---|---|---|---|---|
| 4,001,559 | A | 1/1977 | Osborne et al. | |
| 4,467,444 | A * | 8/1984 | Harmon et al. | 712/42 |
| 5,710,723 | A | 1/1998 | Hoth et al. | |
| 5,764,065 | A | 6/1998 | Richards et al. | |
| 6,445,733 | B1 | 9/2002 | Zuranski et al. | |
| 6,534,996 | B1 | 3/2003 | Amrany et al. | |
| 6,823,004 | B1 | 11/2004 | Abdelilah et al. | |
| 2002/0013935 | A1 * | 1/2002 | Boggs et al. | 717/4 |
| 2002/0060627 | A1 | 5/2002 | Gaiser | |
| 2003/0095591 | A1 | 5/2003 | Rekai et al. | |

OTHER PUBLICATIONS

"DD Registration Package," HART Communication Foundation, Mar. 24, 1999, 6 pages.
"HART® SMART Communications Protocol, Appendix 1—Command Specific Response Code Definitions," Communication Foundation Document No. HCF_SPEC-307, Rev. 4.1; Jan. 15, 1997, 14 pages.
"HART® SMART Communications Protocol, Protocol Specification," Communication Foundation Document No. HCF_SPEC-11, Rev. 5.7; Jan. 20, 1997, 12 pages.
"HART® SMART Communication Protocol Specifications," Communication Foundation Document No. HCF_SPEC-11, Revision 5.9, Nov. 4, 1999, 17 pages.

(Continued)

*Primary Examiner*—Don N Vo
(74) *Attorney, Agent, or Firm*—Fish & Richardson P.C.

(57) ABSTRACT

In one general aspect, data transfer between the modem and a processor connected to the modem may be improved using a variable speed buffer. The variable speed buffer may include one or more first-in/first out buffers (FIFOs) and two interfaces. The FIFOs may be connected between the interfaces to form an input data path and an output data path. Each FIFO may store a complete message. Consequently, an entire message may be transferred from the processor at the processor's higher data rate without having to wait for a modulator to modulate the outgoing message at a slower data rate. The modem automatically may use characteristics of an incoming signal to detect which communications protocol is used to send a message, and perform protocol specific functions. The modem may perform system diagnostic functions to improve system performance.

20 Claims, 9 Drawing Sheets

OTHER PUBLICATIONS

"HART® SMART Communications Protocol, Data Link Layer Specification," Communication Foundation Document No. HCF_SPEC-81, Rev. 7.1; Nov. 27, 1996, 40 pages.

"HART® SMART Communications Protocol, Common Practive Command Specification," Communication Foundation Document No. HCF_SPEC-151, Rev. 7.1, Version A; Jan. 16, 1997, 75 pages.

"HART® SMART Communications Protocol, Common Tables," Communication Foundation Document No. HCF_SPEC-183, Rev. 9.0, Version A; Nov. 15, 1996, 23 pages.

HART® SMART Communication Protocol, "Device Description Language Binary File Format Specification," Communication Foundation Document No. HCF_SPEC-502, Rev. 10.0, Version A; Mar. 16, 1994, 101 pages.

HART® SMART Communication Protocol, "Device Description Language Method Builtins Library," Communication Foundation Document No. HCF_SPEC-501, Rev. 10.1, Version A; Aug. 5, 1996, 121 pages.

HART® SMART Communication Protocol, "Device Description Language Specification," Communication Foundation Document No. HCF_SPEC-500, Rev. 11.0, Version A; Aug. 5, 1996, 102 pages.

"HART® SMART Communications Protocol, Universal Command Specification," Communication Foundation Document No. HCF_SPEC-127, Rev. 5.2, Version A; Jan. 15, 1997, 31 pages.

"HART® SMART Communications Protocol, Command Summary Specification," Communication Foundation Document No. HCF_SPEC-99, Rev. 7.1, Version A; Jan. 15, 1997, 28 pages.

"HART® FSK Physical Layer Specification," Communication Foundation Document No. HCF_SPEC-54, Rev. 8.0, Version A; Jan. 21, 1997, 55 pages.

"HART® FSK Physical Layer Specification," Communication Foundation Document No. HCF_SPEC-54, Rev. 8.1, Preliminary H; Nov. 24, 1999, 88 pages.

"HART® Communication Protocol Specification," Important Announcement re "FSK Physical Layer Specification," Communication Foundation Document No. HCF_SPEC-54, Revision 8.1, May 15, 2000, 3 pages.

HART Protocol Specification Field Communication, "Common Tables," Communication Foundation Document No. HCF_SPEC-183, Rev. 11.0, Nov. 4, 1999, 53 pages.

* cited by examiner

UNIVERSAL INTELLIGENT MODEM

CROSS-REFERENCE TO RELATED APPLICATIONS

This application is a continuation (and claims the benefit of priority under 35 USC 120) of U.S. application Ser. No. 10/320,711, filed Dec. 17, 2002, now allowed. The disclosure of the prior application is considered part of (and is incorporated by reference in) the disclosure of this application.

TECHNICAL FIELD

The following description relates generally to modems and in particular to a universal, intelligent modem.

BACKGROUND

A conventional modem allows a digital processor to communicate over a communications medium, such as an analog carrier loop. The modem converts digital signals to analog signals to be transmitted on the analog carrier loop. The modem also generates digital signals from analog signals received from the carrier loop.

The modem converts voltage levels associated with a digital signal to an analog sine wave using a modulation process. The modem transmits the modulated, analog signal on the analog carrier loop to a receiving modem. The receiving modem receives the analog signal and converts the analog signal to a digital signal using a corresponding demodulation process.

A number of modulation processes may be used to transmit digital data on an analog carrier loop. The modulation process is specified by a communications protocol (e.g., HART, Fox-Com, or the Bell System Spec PUB41212) that is used to encode the data transmitted by the modem. A modem may communicate with another modem if the modems share at least one common communications protocol and both modems use the common communications protocol to transfer data.

To initiate a communication, a processor connected to the modem sends a request to the modem to send a message on the carrier loop. When ready, the modem responds to the request and the processor begins transferring data to the modem. The modem modulates the data associated with the message, bit by bit, as the data is received from the processor, to generate a corresponding analog signal. The processor must continue to transfer the data until the entire message is transmitted on the carrier loop.

A receiving modem responds to a tone of the modulated signal on the carrier loop. This tone causes the receiving modem to generate a carrier detect (CD) signal. The CD signal enables an associated processor to receive the data encoded by the modulated signal.

When transmitting, the modulator of the modem may not be able to process data as fast as the associated processor can supply the data. As a result, the processor may perform other tasks while waiting for the modulator. The modem generates an interrupt to signal when the modulator is ready to process more data. If the processor does not immediately respond to the interrupt, a delay may occur. A delay is not critical as long as the delay does not appear several times in one message. However, as the number of such delays increases, the modem may generate a timeout to cancel the message before the entire message has been received, which renders the entire message invalid.

Similar problems may occur when a message is received by a modem. If a processor associated with the modem that is receiving a message cannot respond to the interrupt of the receiving modem, the incoming data signal may overwrite a portion of the received message and result in lost data. The lost data may corrupt the entire message.

In addition to interruptions in transmission and resulting lost data, other problems may affect data communication. For example, the amplitude of the modulated analog signal also may affect communications. The amplitude of the modulated signal is reduced as the distance traveled by the signal increases. A modulated signal also is more susceptible to noise as the distance increases.

Cross coupling of signals may occur between carrier loops, communications media, and other devices in the operating environment of the carrier loop. The resulting change in amplitudes and noise on the carrier loop may be interpreted as signals by the receiving modem. The noisy signals may cause the modem to interrupt its corresponding processor, which unnecessarily burdens the processor.

SUMMARY

In one general aspect, data transfer between a modem and a processor connected to the modem may be improved using a variable speed buffer. The variable speed buffer may include one or more buffers to store messages. For example, the variable speed buffer may include one or more first-in/first out buffers (FIFOs). The FIFOs may be connected between interfaces of the variable speed buffer to form an input data path and an output data path.

Each FIFO may store a complete message. Consequently, an entire message may be transferred from the processor at the higher data transfer rate of the processor without having to wait for a modulator of the modem to modulate the outgoing message at a slower data rate. Similarly, a complete demodulated message may be stored in a FIFO and read from the FIFO at the data transfer rate of the processor.

In another general aspect, a modem may use the characteristics of an incoming signal to automatically detect the communications protocol that is used to send a message. The modem may include a processor that is configured to automatically search for modulation frequencies of incoming signals. The modem uses a demodulator to measure the frequencies of the incoming message. In addition, the amplitudes of the incoming message may be measured using, for example, an analog-to-digital (A/D) converter. The processor may compare the determined frequencies and amplitudes of the incoming signal to stored characteristics of known communications protocols. If a match is determined, the modem may process the incoming message using the determined protocol.

In another general aspect, the modem may perform protocol specific functions that are normally performed by a processor connected to the modem. After determining a communications protocol, the modem may strip protocol specific data (e.g., start bits, end bits, checksums, and parity bits) from incoming messages. The modem also may perform protocol specific checksum and parity calculations on the message. In addition, the modem may encode outgoing messages with start bits and end bits, checksums, and parity bits.

In another general aspect, the modem may perform system diagnostic functions to improve system performance. For example, the modem may determine and report signal transmission strengths on the carrier loop to a master device. The master device may use the signal strength information to determine whether the carrier loop is operating correctly and to identify potential problems in the system.

The modem also may report any messages that are interrupted (e.g., due to low signal strength) or message amplitudes that are within an operating range but are weak. As a result, problems may be identified and handled before operating conditions degrade enough that messages are not received.

The modem also may determine whether an entire message has been successfully received before generating an interrupt. Lowering the number of interrupts increases the overall operating efficiency of the processor and any associated devices.

In another general aspect, the squelch or range of accepted signal amplitudes received by the modem may be adjusted to various communications conditions. For example, the squelch limit may be raised to block out noisy loop conditions. Adjusting the squelch limit also may allow the modem to receive low amplitude signals if the carrier loop has relatively little noise. The modem may automatically adjust the squelch based on measurements of incoming signals.

In another general aspect, the modem may use different types of interfaces to communicate with a device processor. For example, both serial and parallel interfaces may be used to exchange data with a device processor.

In another general aspect, the modem may perform error correction and detection. A signal received from the carrier loop may be demodulated to a data stream of one or more bits. The demodulated signal also may be stored. The amplitude of the received signal corresponding to each received bit of the data stream is measured. An indication is generated for every bit of the data stream having an amplitude that deviates from an acceptable range. An error associated with the demodulated signal may be detected based on the indication. A parity bit in the demodulated signal may be used with the indication to detect an error in the signal. The error also may be corrected based on the indication and the parity bit. The error may be corrected by overwriting the bit corresponding to the indication. If the processor does not detect a parity error and an even number of bits have corresponding indications, the processor may determine that the signal includes an error.

Other features will be apparent from the description, the drawings, and the claims.

DESCRIPTION OF DRAWINGS

Like reference symbols in the various drawings indicate like elements.

DETAILED DESCRIPTION

System Overview

Figure 1:
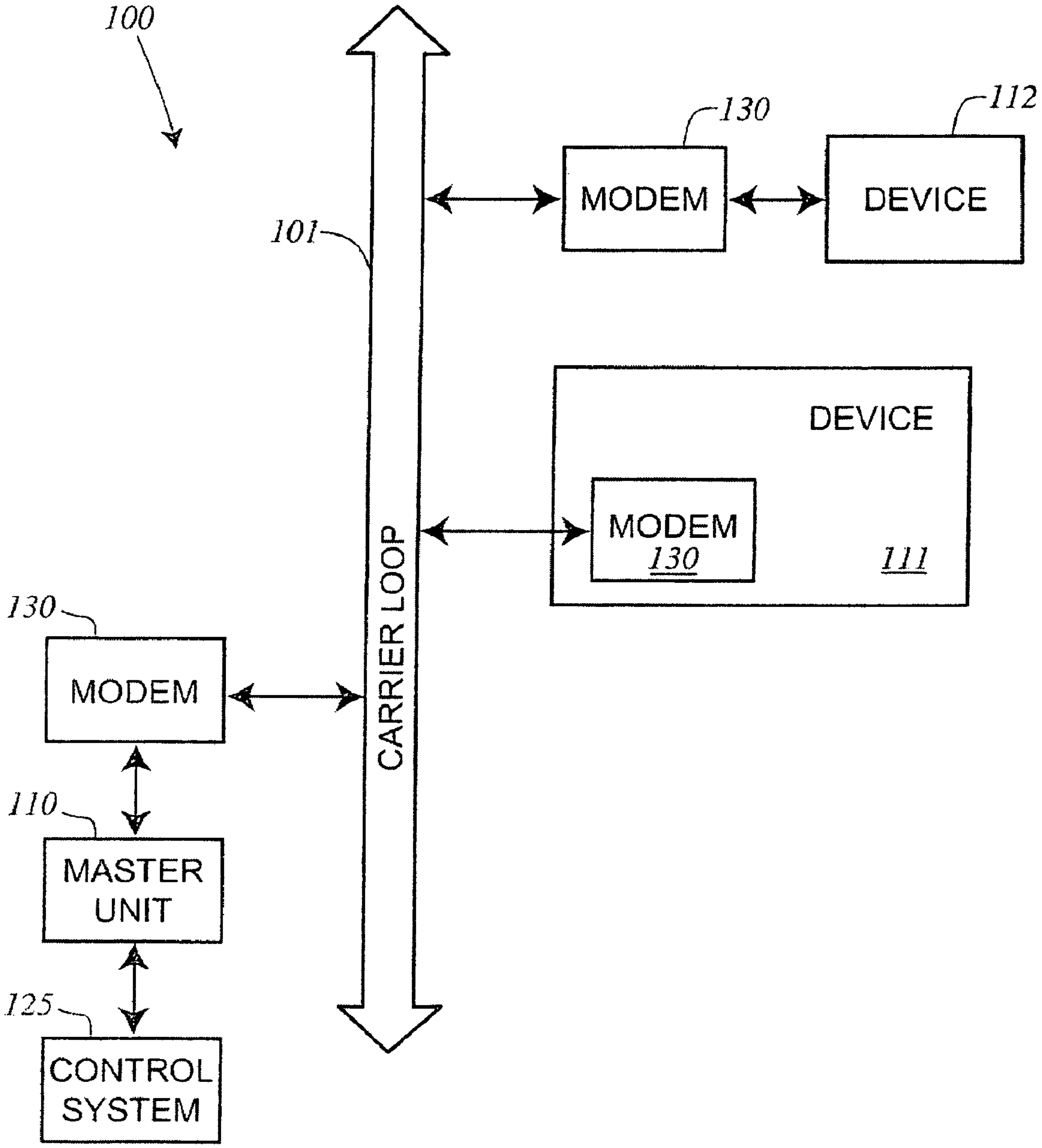
FIG. 1 is an exemplary block diagram of a communications system.

As shown in FIG. 1, an exemplary automated system 100 includes a master device 110 and a number of devices 111 and 112 connected by a communications medium. The communications medium may be implemented using any communication link configured to send and receive signals (e.g., electrical, electromagnetic, or optical) that convey or carry data streams. For example, the communications medium may be implemented using a carrier loop 101, such as, for example, a fieldbus. The carrier loop 101 may be implemented using a twisted pair of wires that carry, for example, currents of 4-20 mA.

The master device 110 may supervise or control a number of industrial field devices 111 and 112 to perform an automated process, such as an industrial field process. The industrial field devices may adjust, set, control, and/or report field process variables for the industrial field process. The industrial field devices 111 and 112 may be a workstation, a computer, a controller, an actuator, a sensor or any combination of these devices. Each of the devices 111 and 112 may include a processor, a microprocessor, a micro-controller, a programmable logic device, or a process variable transmitter.

The master device 110 may be connected to a control system network 125 that manages the system 100. The control system network 125 may include one or more user-interfaces and/or workstations to allow operators and system administrators to monitor and to control the automated industrial field process using the master device 110. The control system network 125 also may be used by operators to obtain system diagnostic information.

Each of the devices, such as the master device 110 and the devices 111 and 112, may be connected to the carrier loop 101 by a modem 130. The modem 130 allows the devices (e.g., 110, 111, and 112) to communicate with each other by sending and receiving signals over the carrier loop 101. Each modem 130 may be internally or externally connected to the devices (110, 111, and 112).

Industrial field communication may be based a master/slave data transfer configuration such as is shown in FIG. 1. The exchange of information (e.g., reading and writing process variables) may be started by the master device 110. The slave device (111 or 112) may respond to requests of the master device 110 (e.g., with requested process information). A single master device 110 may exchange data with several slave devices 111 and 112. The function of the master device 110 may be exchanged between other master devices (not shown). The master device also may send messages to control various system processes and the devices 111 and 112 using various field communications protocols (e.g., fieldbus, Foxcom, and HART).

Universal Intelligent Modem

Figure 2:
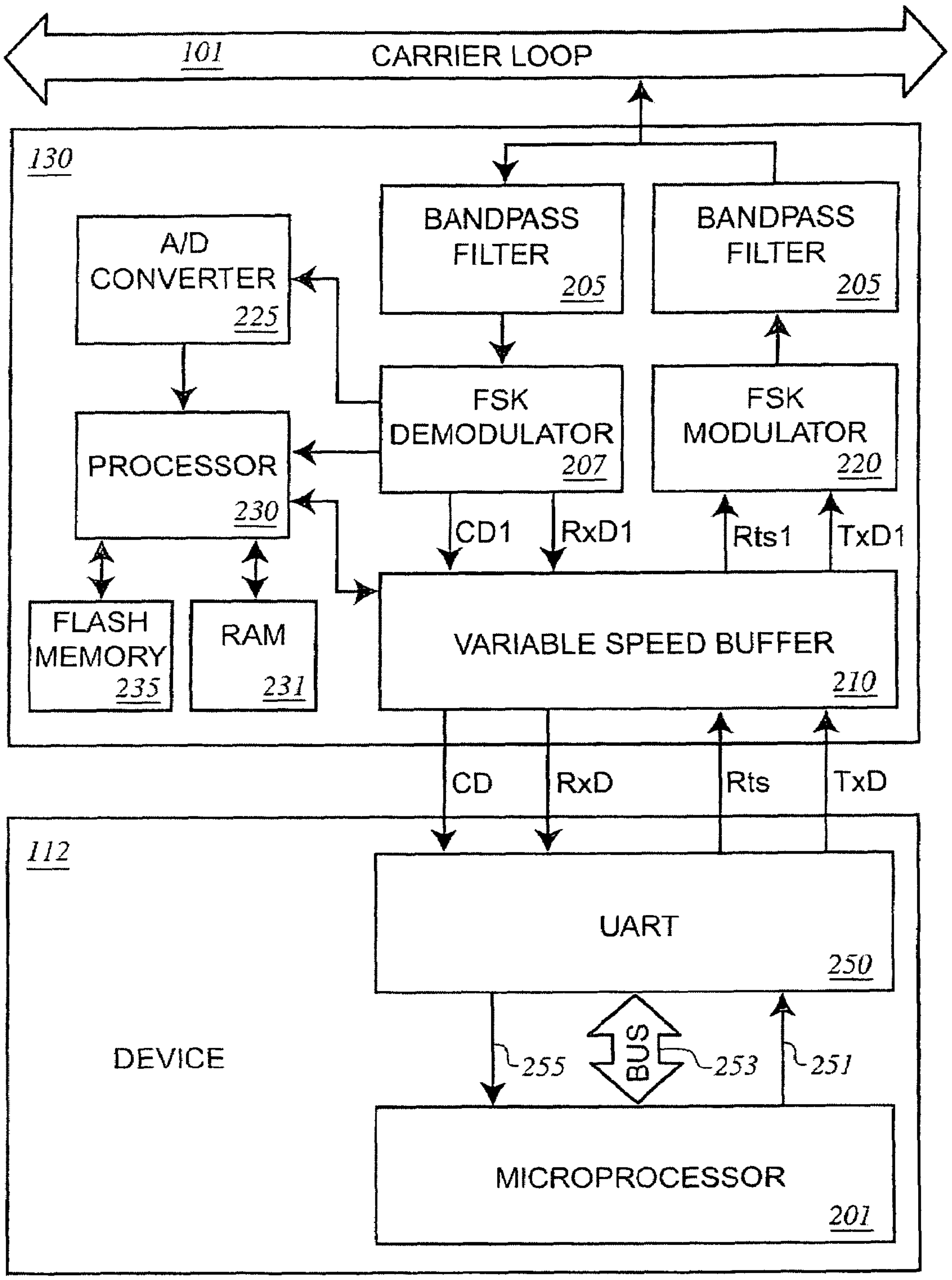
FIG. 2 is an exemplary block diagram of a modem for use in the system of FIG. 1.

FIG. 2 shows an example of a universal, intelligent modem 130 that may be used in the system 100 of FIG. 1. The modem 130 allows an associated processor 201 (e.g., a general purpose processor, a microprocessor, a micro-controller, a programmable logic device, or a sequencer) to transmit and to receive analog signals using the carrier loop 101. The modem 130 may employ any number of modulation techniques, such as frequency shift keying (FSK) modulation, pulse code modulation (PCM), phase shift modulation (PSM), frequency modulation (FM), amplitude modulation (AM), and infrared pulse modulations (e.g., the fast infrared transmission protocol and the slow infrared transmission protocol). For example, FSK modulation shifts a carrier frequency between a first fixed frequency and a second fixed frequency corresponding to voltage levels of the digital information to be transmitted. The first fixed frequency may represent a binary zero, and the second fixed frequency may represent a binary one.

The modem 130 includes an input band pass filter 205 to filter a signal received from the carrier loop 101. The filtered analog signal is input to a demodulator 207. The demodulator 207 demodulates the analog signal using a demodulation process to convert the analog signal to a digital signal. For example, using the FSK demodulation process, the demodulator 207 measures the frequency of an incoming sine wave and converts the measured frequency to an equivalent voltage that corresponds to a binary one or zero.

The demodulated digital signal (e.g., a stream of bits representing ones and zeros) is written to a variable speed buffer 210 using a serial receive data line (RxD1). A carrier detect (CD1) signal also is input from the demodulator 207 to the variable speed buffer 210. A high voltage on CD1 indicates that the demodulator 207 is receiving a signal and is ready to write data to the variable speed buffer 210.

The modem 130 includes a modulator 220. The modulator 220 converts digital signals to analog signals using a modulation process so that the analog signals may be transmitted on the carrier loop 101. The modulator 220 reads a serial bit stream of data from the variable speed buffer 210 using a transmit data line (TxD1). A high voltage on a ready to send line (Rts1) indicates that the variable speed buffer 210 is ready to provide data to the modulator 220 on TxD1. The modulator 220 modulates the serial bit stream to produce an analog signal. For example, the modulator 220 may shift a carrier frequency of a predetermined amplitude between two fixed frequencies corresponding to a voltage level of an incoming bit. The analog signal is filtered by a band pass filter 222 before being transmitted to the carrier loop 101.

An analog-to-digital (A/D) converter 225 is connected in parallel with the demodulator 207. The A/D converter 225 is used to measure the amplitude of AC signals received from the carrier loop 101.

The modem 130 includes a processor 230. The processor 230 controls the operation of the modem 130 in the universal, intelligent mode as described below. A random access memory (RAM) device 231 is connected to the processor 230 to store data, programs, and applications that are used when the modem 130 operates in the universal, intelligent mode. A non-volatile or flash memory 235 also is connected to the processor 230 to store programs, modem configurations, and data. The processor 230 communicates with the processor 201 using the variable speed buffer 210.

The processor 230 may read frequencies from the demodulator 207, for example, to determine an average signal frequency over one or more waves. The average signal frequency may be stored in the RAM 231. The processor 230 also may read measured amplitudes from the A/D converter 225 to determine, for example, an average peak amplitude measured over an entire message, and may store the average peak amplitude in the RAM 231. The processor 230 may use the frequencies and amplitudes to perform various functions, as described in further detail below. In addition, the processor 230 may mark or store an indication of any bits that may contain errors. The marked bits may be used in conjunction with parity checks to correct errors in the received bits as explained below.

In one implementation, one or more of the demodulator 207, the variable speed buffer 210, the modulator 220, the A/D converter 225, the processor 230, the RAM 231, and the flash memory 235 may be implemented using a micro-controller, a digital signal processor (DSP), an application specific integrated circuit (ASIC), or a gate array.

As previously described, a device (110, 111, and 112) may send and receive data over the carrier loop 101 using a modem 130. A processor 201 of the device may control data communication to and from the carrier loop 101. The processor 201 connects to the modem 130 using an interface, such as, for example, a universal asynchronous receiver transmitter (UART), a universal synchronous receiver transmitter (USRT), or a parallel interface. The processor 201 also may connect directly with the variable speed buffer 210. For example, the device 112 may include a buffer (not shown), such as a FIFO that connects to the variable speed buffer 210. In the example shown in FIG. 2, a UART 250 provides a simple connection for an externally connected device 112.

The processor 201 exchanges signals with the UART 250 to control the modem 130 and to exchange information with the modem 130 and the processor 230. A control line 251 sends control signals to operate and configure the modem 130. A data bus 253 allows the processor 201 to read digital data from and write digital data to the UART 250. An interrupt signal 255 is used to indicate that the modem 130 requires the processor 201 to service the modem 130.

Four lines may be used by UART 250 and the variable speed buffer 210 to communicate and exchange data. Data may be read from the variable speed buffer 210 by UART 250 using the receive data line (RxD). The UART 250 reads a carrier detect line (CD) from the variable speed buffer 210 to determine the type of data read on RxD. If the voltage on CD is high, then the data read by UART 250 on RxD has been received by modem 130 from the carrier loop 101. If the voltage on CD is low, the data read by UART 250 on RxD is a message from the processor 230 to the processor 201.

The variable speed buffer 210 reads data to be transmitted from UART 250 on the transmit data line (TxD). The variable speed buffer 210 reads a request to send line (Rts) to determine the content of data read on TxD. If the voltage on Rts is high, the data read from TxD is transmitted to the carrier loop 101 by modem 130. If the voltage on Rts is low, then the data read from TxD is a message from the processor 201 to the processor 230 (e.g., a control signal).

Although a UART interface with handshaking signals RTS, TXD, CD, and RXD is described above for asynchronous transmission, other interfaces also may be used. For example, a USRT may be used (e.g., with handshaking signals RTS, CD, a data input/output (data-IO), and a clock (CLK)). A parallel interface also may be used (e.g., with handshaking signals RTS, DATA (7.0), CD, Chip Select, read (RD), write (WR), and ready (RDY)). The UART and USRT interfaces require fewer signals and are less expensive than a parallel interface. However, the parallel interface provides higher data transfer rates between the processor 201 and the modem 130.

Initially, the modem 130 may be configured to operate in a default or non-intelligent mode. While operating in the non-intelligent mode, the modem 130 may function in a manner similar to a conventional modem. For example, the modem 130 may be pre-configured to use one of several communication protocols supported by the modem 130. Examples of different communication protocols that the modem 130 may use include, for example, the Hart protocol (having a transfer rate of 1200 bps to the UART 250 and frequency tones of 1.2 kHz and 2.2 kHz tones), the FoxCom 1T1 protocol (having a transfer rate of 600 bps to the UART 250 and frequency tones of 3.125 kHz and 6.25 kHz) or the FoxCom IT2 protocol (having a transfer rate of 4800 bps to the UART 250 with frequency tones of 5.2 kHz and 10.4 kHz). While operating in the non-intelligent mode, the modem 130 may transmit signals on the carrier loop 101 using a pre-configured protocol or the modem may try different protocols. If the modem receives a reply from another modem, then communications may be established.

The modem 130 also may operate in universal, intelligent mode. While operating in the universal, intelligent mode, the processor 230 optimizes data transfer between the modem 130 and the processor 201 using the variable speed buffer 210. In addition, the processor 230 may automatically detect communications protocols, configure the modem 130 for the detected communications protocols, and perform protocol specific functions. The modem 130 also may perform system diagnostic functions and error correction. These and other aspects of the universal, intelligent mode are discussed in detail below.

The modem 130 may be placed in the universal, intelligent mode when the processor 201 sends a configuration enable signal (ConfigEnb) from UART 250 to processor 230. A manual switch or user input (e.g., during installation) also may be used to place the modem 130 in the universal, intelligent mode.

Variable Speed Buffer with Self-Adapting Transmission Rates

Typically, a processor is able to process data at much faster rates than a modem. As a result, when the modem transmits or receives data, an associated processor must wait or remain idle during periods in which the modem processes the data. During this time, the processor is unable to perform other tasks. Alternatively, the processor may perform other tasks and service interrupts. However, once the modem begins transmitting or receiving a signal, the processing of the signal by the modem may not be stopped. Therefore, the processor must repeatedly service interrupts from the modem. Servicing interrupts is difficult for a processor running a task intensive operating system, such as, for example, Windows™. In addition, if an interrupt is missed or data transfer to or from the modem is delayed, data may be lost or corrupted.

When modem 130 operates in the universal, intelligent mode, data transfer between the modem 130 and the processor 201 may be optimized using the variable speed buffer 210. The variable speed buffer 210 may include one or more buffers that provide storage of an entire message (or a substantial portion of a message). The buffers may operate at different data transfer rates optimized for the transfer of data between the modulator/demodulator and the device processor 201.

Figure 3:
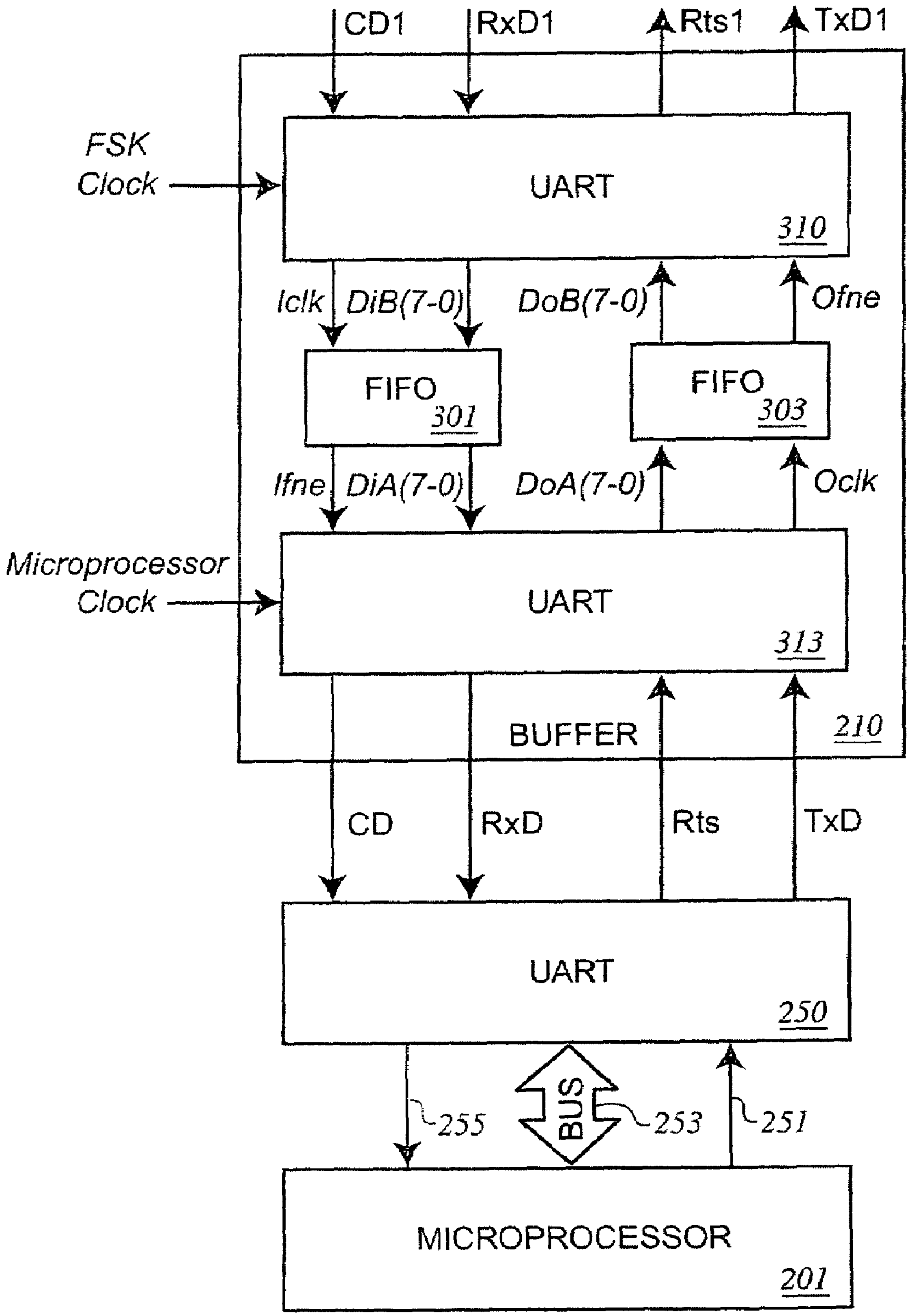
FIG. 3 is an exemplary block diagram of a variable speed buffer that may be used in the modem of FIG. 2.

FIG. 3 shows an example of a variable speed buffer 210 that includes two first-in/first out (FIFO) buffers 301 and 303 and two UARTS 310 and 313. The two PIFOs 301 and 303 are connected between the UARTs 310 and 313 to form an input data path (including the FIFO 301) and an output data path (including the FIFO 303).

Each of the FIFOs 301 and 303 may be large enough to store a complete message. Consequently, an entire message may be transferred to the FIFO 303 from the processor 201 at the higher data transfer rate of the processor 201 without having to wait for the modulator 220. The modulator 220 may access the FIFO 303 to modulate the data to be transmitted to the carrier loop 101 without generating any additional interrupts to the processor 201. Similarly, the demodulator 207 may demodulate an incoming message and store the demodulated message in the FIFO 301 at the incoming demodulation rate. The processor 201 may read the received message from FIFO 301 at the data transfer rate of the processor 201 without generating multiple interrupts.

As shown in FIG. 3, the UART 310 may include inputs CD1 and RxD1. Demodulated data may be read by UART 310 from demodulator 207 on serial line RxD1 when the voltage on CD1 becomes high. The UART 310 converts the modulated data from a serial bit stream to bytes that are shifted in parallel to the FIFO 301.

The inputs to the FIFO 301 are an input clock (Iclk) and data inputs DiB (7-0). The outputs of FIFO 301 are input FIFO not empty (Ifne) signal and data inputs DiA (7-0). The parallel bytes are shifted to the FIFO 301 from UART 310 on the eight input lines of the DiB using the clock signal Iclk. The UART 310 may continue to shift received bytes to FIFO 301 until the entire message is demodulated.

Once the entire message is stored in the FIFO 301, the UART 313 provides a high voltage on CD to indicate that there is an incoming message for the processor 201. The UART 250 generates an interrupt to the processor 201 and begins reading data on RxD. Data is shifted out of FIFO 301 to the UART 313 in bytes on data lines DiA. The UART 313 transforms the parallel shifted bytes back to a serial bit stream and transmits the bit stream to the UART 250 on RxD. The signal Ifne indicates whether data remains in the FIFO 301. As long as the voltage on Ifne remains high, UART 313 continues to read data on lines DiA.

Inputs to the UART 313 include Rts and TxD. Data may be read by UART 313 from UART 250 on serial line TxD when the voltage on Rts becomes high. The UART 313 converts the modulated data from a serial bit stream to bytes that may be shifted in parallel to the FIFO 303.

The inputs to the FIFO 303 include an output clock (Oclk) and data outputs DoA (7-0), and the outputs of the FIFO 303 include a FIFO not empty (Ofne) signal and data outputs DoB (7-0). The parallel bytes are shifted to the FIFO 303 from UART 313 on the eight input lines of the DoA using the clock signal Oclk. The UART 313 continues to shift received bytes to FIFO 303 until the entire message to be transmitted is stored in FIFO 303.

Once the entire message is stored in the FIFO 303, the UART 310 provides a high voltage on Rts1 to indicate that there is an outgoing message for the modulator 220. In response, the modulator 220 begins reading data on TxD1. Data is shifted out of FIFO 303 to the UART 310 in bytes on data lines DoB. The UART 310 transforms the parallel-shifted bytes back to a serial bit stream that is supplied to the modulator 220 on TxD1. The signal Ofne indicates whether any data remains in the FIFO 303. As long as the voltage on Ofne remains high, UART 310 continues to read data on lines DoB.

The variable speed buffer 210 also may be implemented without the UARTS 310 and 313. For example, data may input to and read directly from the FIFOs 301 and 303 using one or more buffers (e.g., FIFOs) associated with the processor 201. Other interfaces that are compatible with the interface associated with the processor 201 also may be used as described above. For example, a USRT may be used in place of the UART to transfer data. Similarly, a parallel interface also may be used, for example, to provide a higher rate of data transfer between the variable speed buffer 210 and the processor 201.

Although two FIFOs 301 and 303 are shown in FIG. 3, a single FIFO also may be used. If a single FIFO is used, received and transmitted messages may not overlap in the FIFO. For example, an entire received message must be read from the FIFO before a message may be transmitted. The processor 230 may regulate the direction of data flow from the modulator and the demodulator.

The variable speed buffer 210 provides independent, self-adapting transfer rates for the demodulator 207, the modulator 220, and the processor 201. UART 310 receives a modulation clock from the processor 230. The processor 230 determines the modulation clock based on the modulation process used by the demodulator 207 or the modulator 220 (e.g., as specified by the communications protocol used to send or receive signals on the carrier loop 101). The rate at which data is transferred to and from the UART 310 on RxD1 and TxD1 is based on the modulation clock. The modulation clock also is used by UART 310 to generate the clock Iclk, and, therefore, provides automatic synchronization to shift received data to FIFO 301.

The UART 313 also is provided with a processor clock by the processor 230. The processor clock is specifically adapted to match the clock that is used by the processor 201 to transfer data. The processor clock rate may be stored in a configuration register in the RAM 231 or in the flash memory 235, or the processor clock rate may be detected by the UART 313 in conjunction with the processor 230 (e.g., by detecting the baud rate used to transfer a start bit from the processor 201 to the UART 313). The processor clock determines the rate at which data is transferred to and from the UART 313 on RxD and TxD. The processor clock also is used by UART 313 to generate the clock Oclk and to provide automatic synchronization to shift received data to FIFO 303.

If the modem 130 is operating in the non-intelligent mode, the modulation clock and the processor clock are both set to the same rate based on the modulation process used to send or receive a signal. However, when the modem 130 operates in the universal, intelligent mode, the modulation clock may be independently adapted to the specific communication protocol used to modulate/demodulate data, and the processor clock may be adapted to the processor's data processing rate as described above. As a result, the processor 201 may independently read and write data based on its own (typically faster) clock rate, which generates fewer interrupts and provides faster data transfer between the device processor and the modem.

Bit errors occurring from data transfer between the modem 130 and the processor 210 also may be reduced, because the modulation and processor clocks are independently adapted to the specific UARTs 310 and 313 that perform the data transfers. An accurate baud rate should be used in each UART 310 or 330 to provide a low bit error rate in transmitted and received data. An accurate baud rate may be achieved by providing the UARTS 310 and 313 with a clock signal using a high frequency input clock and a clock divider having ranges wide enough to generate the specific clock rates required by the processor or the modulation process. The clock divider may be controlled by the processor to generate the clock rate.

Communications Protocol Detection and Processing

To establish a communications link, the receiving modem must use the same communications protocol as the transmitting modem. For example, the transmitting and receiving modem should use the same baud rate, preamble, addresses, and frames that are specified by the communications protocol. In order to establish the communication link, a conventional modem may transmit an analog signal using a selected communications protocol. If the modem receives a reply, then the correct communications protocol has been established. A modem may try several different protocols until the modem receives an answer. If the modem does not receive an answer, the processor associated with the modem may determine that a link may not be established.

The selected communications protocol also may be used to decode messages. During decoding, the processor associated with the modem performs checksum and parity calculations based on the communications protocol used to encode the message. The calculations may be used to determine whether any errors have occurred during transmission of the message. If an error is detected, the message may have to be retransmitted.

When operating in the universal, intelligent mode, modem 130 may use the characteristics of the incoming signal to detect the communications protocol used to send the message. The detected communication protocol may be used to automatically configure the modem 130. The modem 130 may be configured by the processor 230 to automatically measure properties of incoming signals. For example, the modem 130 may measure the amplitudes and frequencies of any incoming signals.

The demodulator 207 may be used to measure the time between zero crossings of the sine wave of an incoming signal. The processor 230 may determine the frequency of the incoming signal based on the average time between the zero crossings.

The amplitude of the signals may be measured using the A/D converter 225. For example, the measurement of the A/D converter 225 may be synchronized with a delay time from the zero crossing of the modulated signal so that the measurement is near the expected peak of the signal. The A/D converter 225 also may use a sample hold input circuit (not shown) to determine the amplitude of the signal at a specific time relative to the waveform. The A/D converter 225 also may sample the incoming signal a number of times using a fast slope time so that the highest measurement approximates the amplitude of the signal.

The processor 230 may compare the determined frequency and amplitude of the incoming signal with a table of characteristics of known communications protocols. The table may be stored in the RAM 231 or in the flash memory 235. If the processor 230 determines that a match exists between the incoming signal and a communication protocol, the modem 130 processes the incoming message using the determined communications protocol.

If the communications protocol is not recognized, the processor 230 may ignore the incoming message and set a diagnostic status flag. The diagnostic flag may be used to indicate that another communication protocol is being transmitted on the same carrier loop 101. The diagnostic flag also may be used to indicate that cross talk or other noise from the field environment may be coupled with or generating signals on the carrier loop 101, and that these signals should not interrupt the processor 201.

The modem 130 also may perform protocol specific functions that are normally performed by the processor 201. Most communications protocols include messages with start bits, end bits, checksums, and parity encoded information that must be stripped from the message during decoding. Conventional modems do not perform any of these decoding functions. Instead, the decoding functions are performed by a processor connected to the modem. However, when operating in the universal, intelligent mode, modem 130 may be configured to perform encoding/decoding functions specific to the communications protocol.

For example, after the processor 230 has determined the communications protocol of the message, the processor 230 may automatically strip an incoming message of the start and end bits. In addition, the processor 230 may perform a checksum calculation for the received bits and may strip the checksum after performing the calculation. The processor 230 also may automatically encode outgoing messages with start bits, end bits, and a checksum. The encoding and checksum processing may be configurable (e.g., a byte checksum or cyclical redundancy check (CRC)) based on the determined communications protocol used to process the message.

The processor 230 also may automatically perform parity calculations for received data messages. After the message has been partially decoded (i.e., after the start bits and the end bits have been removed and the checksum calculation has been performed), the processor 230 may perform parity calculations for the message and strip the parity bits. Similarly, the processor 230 may perform parity encoding on an outgoing message. In addition to parity calculations, the processor 230 may perform error correction as described in detail below.

By performing some of the encoding and decoding functions that are typically used to send and receive messages, the modem 130 relieves the processor 201 from performing these functions. As a result, the processor 201 is free to perform other tasks.

The accuracy of the transmitted and received data may be improved by checking the parity bits and checksum immediately after receipt of data from the carrier loop 101 or before transmission of the data to the carrier loop 101. For example, the modem 130 may include a loop back function to perform tests of carrier loop 101 and modem 130. For example, a signal transmitted by the modem 130 also may be read from the carrier loop 101 by the modem 130 (and demodulated as an incoming message). The message read from the carrier loop 101 may be compared against the original transmitted data to determine whether any errors occurred. If errors are detected, then the modem 130 may retransmit the message, store, and/or report the loop conditions. The loop back function may be useful if sporadic bit errors occur during transmission in a noisy environment.

System Diagnostics

To receive a message in a conventional modem, the incoming signal should be within an expected amplitude range. The amplitude of a signal may be weakened by noise, a bad connection, a short circuit, or a failing transmitter. A conventional modem simply determines whether the signal initially is within operating parameters and whether the signal may be processed by the modem.

A problem may occur when a conventional modem has started to receive a message and the amplitude of the signal falls out of the accepted amplitude range. For example, if the received signal has an acceptable amplitude, a conventional modem generates an interrupt to the associated processor to indicate that an incoming message is being received. In response, the processor stops other tasks to handle the interrupt associated with the incoming message. If the amplitude of the incoming signal drops out of the accepted range while the message is being received, the modem generates an error and the message must be retransmitted. As a result, the processor is unnecessarily interrupted.

When operating in the universal, intelligent mode, the modem 130 may perform system diagnostics that improve system performance. For example, the modem 130 may determine and signal transmission strengths on the carrier loop 101 by measuring the amplitude of received messages. The modem 130 may report signal transmission strengths to the master device 110, and the master device 110 and the control system 125 may use signal strength information to determine whether the carrier loop 101 is operating correctly and to identify potential problems in the system 100.

The modem 130 also may determine whether an entire message has been successfully received before interrupting the processor 201. As a result, power may be saved and the efficiency of the processor 201 may be increased by eliminating unnecessary interrupts. The modem 130 also may report when the modem 130 receives messages that are interrupted (e.g., due to low signal strength) or when message amplitudes are within the proper operating range but are weak or borderline.

The master device 110 or control system 125 may solicit information about loop conditions. The modem 130 or field device (111 or 112) also may be configured to report loop conditions. As a result, the system 100 may be notified when operating conditions start to deteriorate. Processing of system diagnostics is described in detail below.

The modem 130 may further reduce the number of interrupts to the processor 201 by maintaining the CD signal even if the peak amplitude of an incoming signal drops while receiving the signal. Instead, the modem 130 may continue to process the signal as long as no parity error occurs.

The modem 130 also may be configured to adapt to changing carrier loop conditions. For example, the modem 130 may adjust the squelch limit to compensate for carrier loop conditions. The squelch limit of the modem 130 may be used to indicate a minimum amplitude of the signals that may be received from the carrier loop 101. By adjusting the squelch limit, the modem 130 may avoid unnecessary interrupts or loss of signal during receipt of a message.

For example, if the modem 130 detects a number of incoming signals (e.g., due to noise on the loop) that result in the generation of a carrier detect without a corresponding message, the processor 230 may increase the squelch limit. The squelch limit may continue to be incremented until the number of false carrier detects is determined to be acceptable. Similarly, if no false carrier detects are received over a time period, the processor 230 may decrease the squelch limit. The adjustable squelch feature may be configurable (e.g., on or off) and may have configurable limits, such as a maximum (e.g., 150 mVpp) and/or a minimum (e.g., 80 mVpp).

While operating in the universal, intelligent mode, the modem 130 detects if there is any activity on the carrier loop 101. If no activity is detected, then the modem 130 waits for a signal to be received. If activity is detected, the modem 130 measures the amplitude of the signal as described above.

The processor 230 may read the measured amplitude from the A/D converter 225 and determine whether the signal amplitude is within a predetermined range. For example, the Hart communications protocol specifies that received signal amplitudes should be higher than 80 mVpp for an incoming message. Amplitudes lower than 80 mVpp may be considered noise or cross talk and may be ignored by the modem 130. The amplitude requirements for different communications protocols may be stored in the RAM 231 or in the flash memory 233. If the amplitude of an incoming signal is higher than a minimum amplitude, the modem 130 starts to process the signal. The processor 230 continues to monitor the amplitude of the signal according to the predetermined range as the signal is received.

Once the modem 130 starts to receive the signal, the modem 130 demodulates the signal and stores the corresponding data in the FIFO 301. The processor 230 determines whether, at any time while receiving the signal, the amplitude of the signal drops outside the predetermined range. If the amplitude drops out of the range, the processor 230 generates a status/diagnostic flag and/or increments a counter. However, as long as no parity bit error occurs, the message demodulation continues.

If a parity bit error occurs, then no interrupt is generated and the received message is not transferred to the device processor 201 (or the transfer may be canceled if the transfer has already been started). If a parity error occurs, the device processor 201 may wait for the message to be retransmitted (e.g., because the master device 110 may repeat the message one or more times if there is no reply within a specified time). The modem 130 also may request that the message be retransmitted if a corrupted message is received and the header of the message with the communication address is without a parity error but, for example, the end of the message has been corrupted.

The request-for-retransmission feature may be configured during the initialization of the modem 130. Errors in received messages may be tracked using a count and/or an error log stored in the RAM 231. The error log may be periodically transferred to the master device 110, or the error log may be directly read from the modem 130 by, for example, a field technician. The error log also may be included in a diagnostic report sent to the master device.

If the entire message is successfully transmitted, an interrupt to the processor 201 may be generated. After receiving the interrupt, the processor 201 reads the message from the variable speed buffer 210.

The A/D converter 225 also may be used to measure the average amplitude of the entire message. The average peak amplitudes may be stored in the RAM 231. The master device 110 may periodically send a diagnostic message to every modem 130 connected to the carrier loop 101 to report signal amplitudes. Upon receipt of the message, the processor 201 at each device may request a read out of the averages from the processor 230. The processor 201 may transmit back the averages in a message to the master device 110.

In addition, the processor 230 may be programmed to report modem conditions (e.g., if signal amplitudes start to deteriorate). The processor 230 may send a message to the processor 201 to report that signals are being received but at levels that are not optimal. The processor 201 reads the message and may send a message to the master device 110 reporting conditions of signals received by the modem 130. As a result, the master device 110 may be alerted to changing loop conditions before the conditions become critical or the system fails. In this way, maintenance or other appropriate actions may be made in a timely manner.

Figure 4:
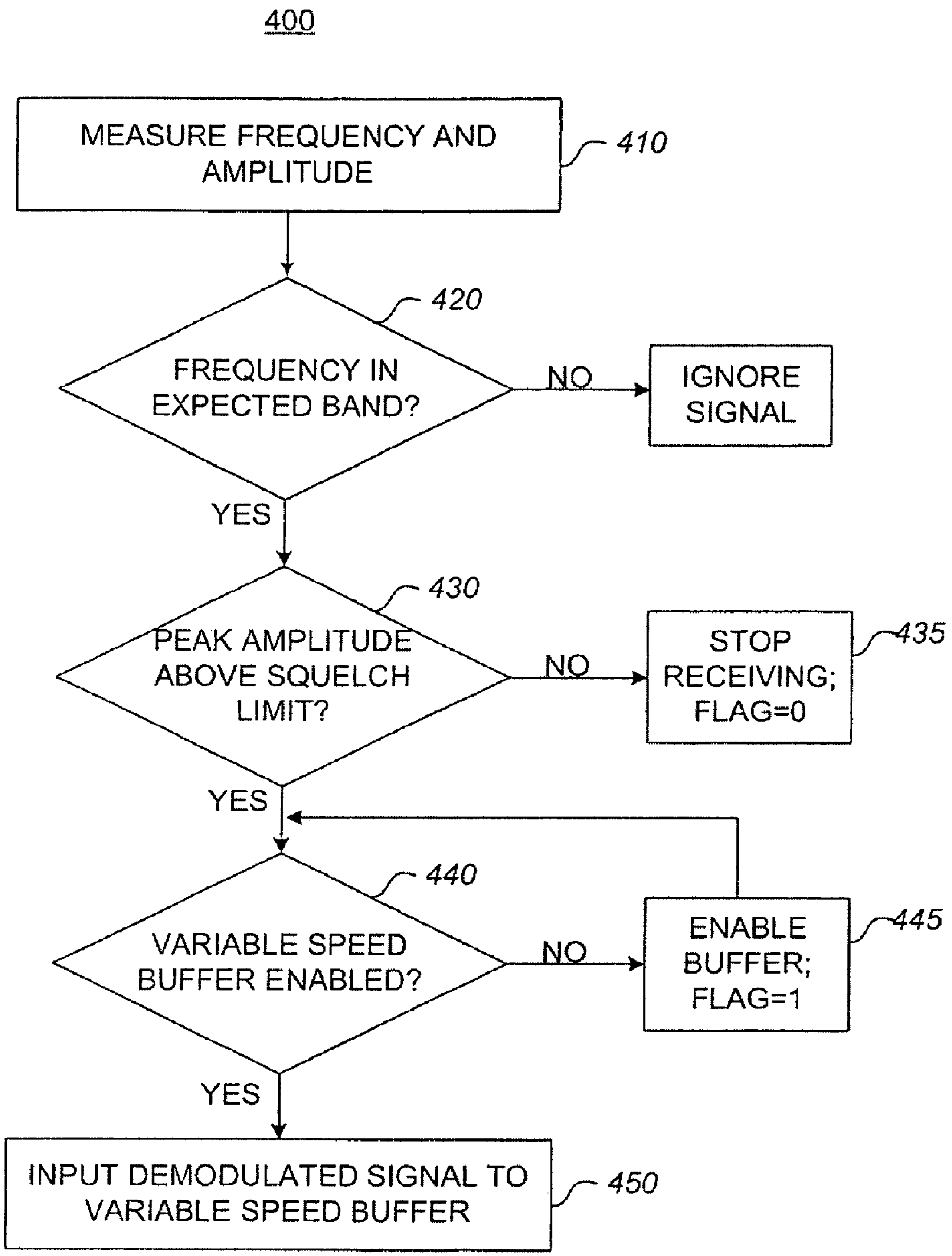
FIG. 4 is an exemplary demodulation process that may be implemented by the modem of FIG. 2.

FIG. 4 shows an example of a method 400 for handling the analog input and demodulation of received signals. The modem 130 measures the frequency and amplitude of a signal that is received (step 410), as described above. The processor 230 determines if the frequency is within the expected communication frequency band for transmitted signals (step 420). If the frequency is incorrect, the modem 130 ignores the incoming signal (e.g., because the signal is noise).

If the frequency is within the expected communication bandwidth, the processor 230 determines if the peak amplitude of the signal is above a squelch limit (step 430). If the amplitude is below the squelch limit, the processor 230 stops receiving the incoming signal and sets a receive flag (e.g., Rcv_Flag=0) to indicate the variable speed buffer 210 should not receive data (step 435). If the frequency and the amplitude are determined to be acceptable, the processor 230 detects whether the variable speed buffer 210 is enabled (e.g., if the Rcv_Flag=1) (step 440). If the variable speed buffer 210 is not enabled, then the processor 230 enables the variable speed buffer 210 (e.g., set Rcv_Flag=1) (step 445). Once the variable speed buffer 210 is enabled, the modem 130 begins to input the demodulated signal to the variable speed buffer 210 (step 450). The steps are repeated as the modem 130 receives the signal.

Figure 5:
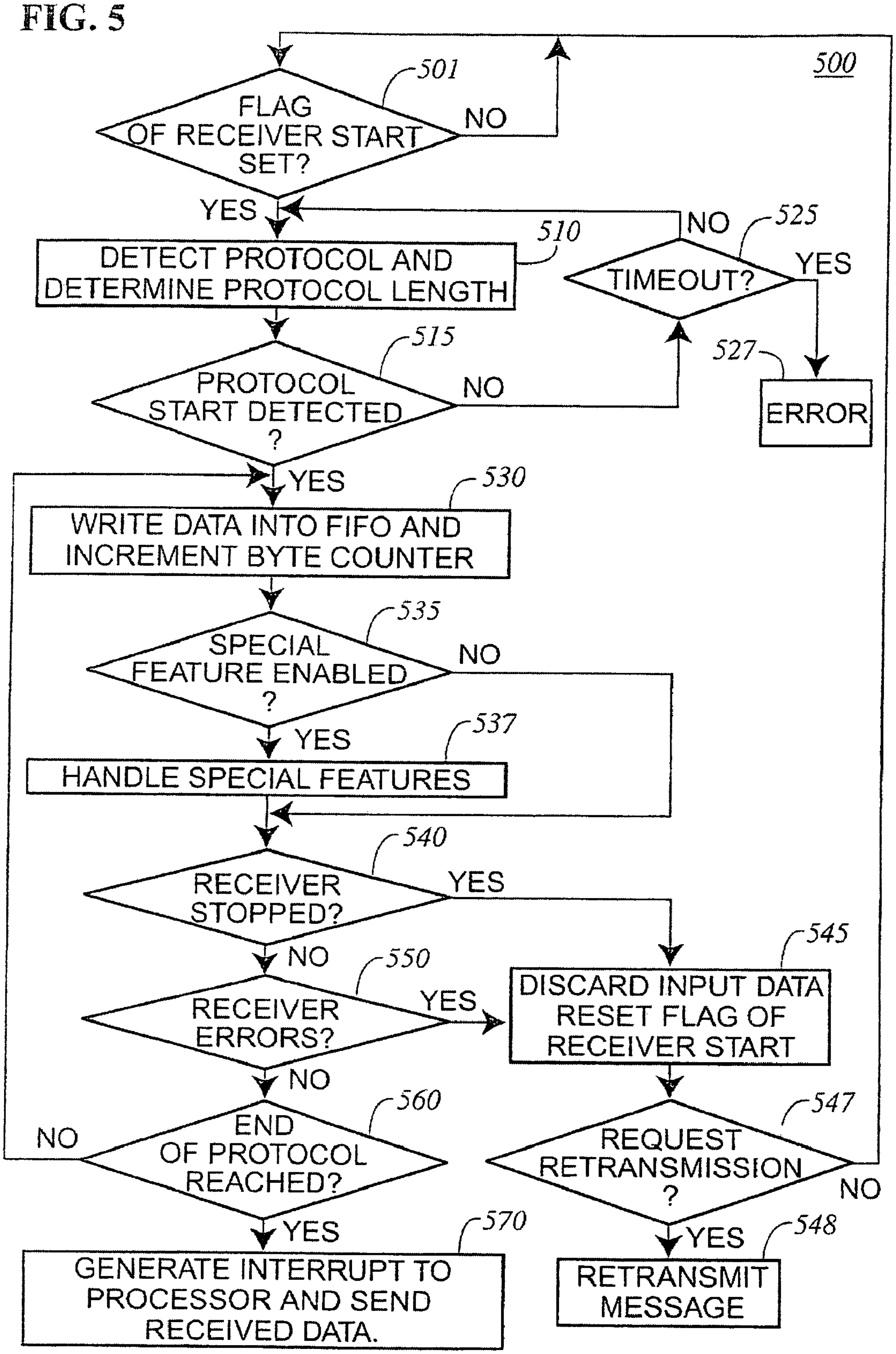
FIG. 5 is an exemplary process for protocol detection that may be implemented using the modem of FIG. 2.

FIG. 5 shows an example of a procedure 500 for protocol detection. The processor 230 determines if a receive flag is set (e.g., Rcv_Flg=1) (step 501). Once the receive flag is set (e.g., Rcv_Flg=1), the demodulated bit stream is input to the variable speed buffer 210. The processor 230 searches the input bit stream to detect a protocol associated with the received signal (step 510). For example, the processor 230 searches the bit stream for a start sequence associated with a protocol, or compares the frequencies or amplitudes of the signals to those associated with various protocols to determine whether a protocol is detected (step 515).

Once a protocol is detected, the processor 230 also determines the length of messages associated with the protocol (step 520). The protocol length may be used to set a byte counter maintained by the processor 230.

If the protocol is not detected, the processor 230 determines if a time out is reached (step 525). If the time out is reached, the processor 230 generates an error (e.g., indicating that a protocol could not be determined for an incoming signal) and stops receiving the bit stream (step 527). Otherwise, the processor 230 continues to try to determine a protocol associated with the received signal (step 510).

Once a protocol is detected, a byte is written into the FIFO 301 and the byte counter is incremented (step 530). The modem 130 also determines whether any special features are enabled (e.g., a device address check, a checksum calculation, a parity check, a CRC check, and a squelch range adjustment) (step 535) and performs these features on the incoming data (step 537).

As the signal is received, the processor 230 determines if modem 130 stops receiving the signal (step 540). If the modem 130 stops receiving the signal, the data stored in the FIFO is discarded and the flag is reset (e.g., set Rcv_Flg=0) (step 545). The modem 130 also may request retransmission of the signal (steps 547 and 548). Otherwise the modem 130 remains ready to receive the next signal (step 501).

If the modem 130 continues to receive the signal, the processor 230 determines if any errors are detected (e.g., parity and checksum) (step 550). If errors are detected, the data stored in the FIFO 301 is discarded the flag is reset (e.g., set Rcv_Flg=0) (step 545). If enabled, the modem 130 may request retransmission of the signal (steps 547 and 548). Otherwise, the modem 130 remains ready to receive the next signal (step 501).

If no errors are detected, the processor 230 determines if the end of the message has been reached (e.g., by determining if the byte counter equals the determined protocol length) (step 560). If the message is not completed, the processor 230 continues to write data to the FIFO 301 and to increment the byte counter (repeating steps 535-560 as warranted until the end of the message is reached). If the end is reached, variable speed buffer 210 generates an interrupt (e.g., generating a high output on the CD line) and outputs the data from the buffer to the processor (step 570).

Figure 6:
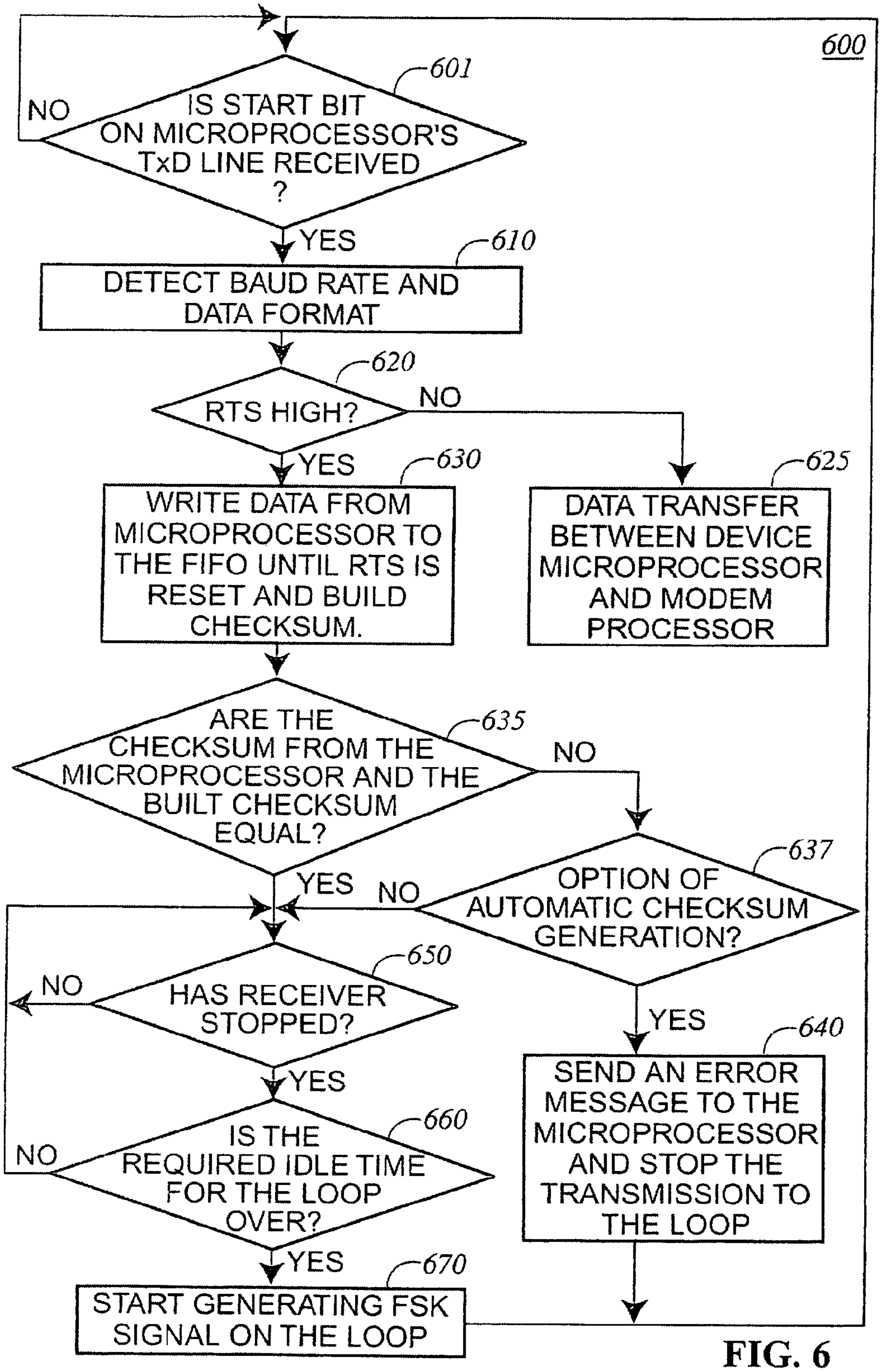
FIG. 6 is an exemplary modulation process that may be implemented using the modem of FIG. 2.

FIG. 6 is an example of method 600 to modulate data to be transmitted to the carrier loop 101. The processor 230 waits until a start bit is detected on the on the TxD line of the variable speed buffer 210 (step 601). Once a start bit is detected, the processor 230 determines the baud rate from incoming signal (step 610).

The processor 230 also determines if the RTS line is high or low (step 620). If RTS is low, then the processor 230 determines that the signal is directed to the processor 230 (step 625). If the RTS line is high, then processor determines that the incoming signal is to be transmitted, and the data is input to the FIFO 303 (step 630).

As the data is input, the processor 230 also determines a checksum from the incoming data. If configured, the processor 230 then determines whether the determined checksum is the same as the one provided by the processor 201 (step 635). If the checksum does not match, then processor 230 determines whether a checksum was provided by the processor 201 (step 637). If a checksum is not provided, the processor 230 generates an error message and stops receiving the signal (step 640).

If the checksum matches, or the processor 201 did not provide a checksum, then the processor 230 determines whether the entire message is received (step 650). If not, the processor 230 waits until the entire message is received. Once the message is received, the processor 230 determines whether the loop is idle (step 660). The processor 230 waits until the loop is idle before transmitting the signal (step 670).

Figure 7:
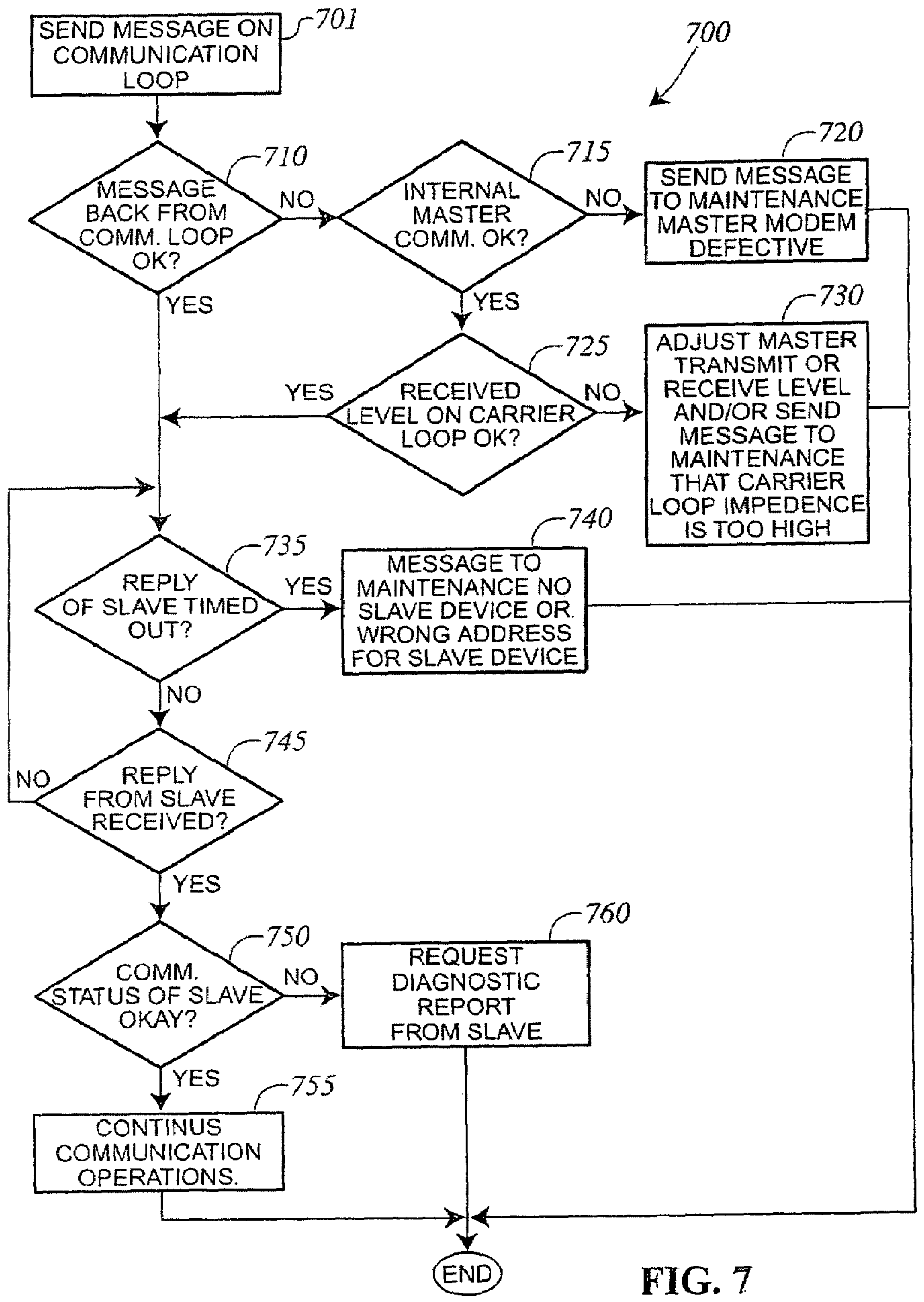
FIGS. 7 and 8 are exemplary diagnostic processes that may be implemented in the system of FIG. 1.

FIG. 7 shows a diagnostic process 700 that may be carried out by the master device 110 to determine modem and carrier loop conditions. The master device 110 may periodically, at scheduled times, or on command send out a communication or diagnostic message on the carrier loop 101 (step 701). For example, the master device 110 may send a diagnostic message addressed to a modem 130 on the carrier loop 101. The master device 110 may read the communication back from the carrier loop 101 using modem 130 to determine whether loop communications are acceptable (step 710) (e.g., using the loop back feature of the modem 130). If the master device 110 is unable to read the message, there are errors in the message, or the message is not acceptable, then the master device 110 may check its modem 130 to determine whether the master device 110 and the modem 130 are functioning properly (step 715). If not, a maintenance message is sent to control system network 125 (e.g., to a system administrator or operator) indicating that a problem exists with the master device communications (step 720).

If it is determined that master device 110 and modem 130 are properly operating (step 715), then the master device 110 determines whether signal levels received from the carrier loop 101 are within acceptable ranges (step 725). If not, the master device 110 may adjust its transmit or receive level and/or send a message to the control system network 125 that loop impedance levels are unacceptable (step 730).

If the received carrier loop signal levels are determined to be acceptable (step 725), the master device 110 determines whether too much time has elapsed for a reply from the slave device 111 or 112 (e.g., the reply has timed out) (step 735). If the time for reply is exceeded, the master device 110 may send a message to the control system network 125 that there is no slave device 111 or 112 or that the address for the slave device 111 or 112 is incorrect (step 740). If the reply from the slave device 111 or 112 has not timed out (step 735), the master device 110 waits for a reply (step 745).

If a reply is received (step 745), the master device 110 determines whether the communication status of the slave device 111 or 112, is ok (step 750). For example, a bit in the status message received from the modem 130 of the slave device 111 or 112 may indicate that the modem 130 has detected a communication problem (as described above). If the communication status of the slave device 111 and 112 is okay, communications proceed unaffected (until the next diagnostic message is transmitted). If the status indicates that a communication problems exists, the master device 110 requests a diagnostic report from the slave device 111 and 112 (step 760).

The diagnostic report from the slave device may be used to ascertain conditions of the carrier loop. The diagnostic report may include various data about the modem 130 and loop conditions. For example, the diagnostic report may include the amplitude measurements of the slave device (e.g., the amplitude of the last received message start, the average amplitudes of the entire last received message, or the amplitude of the last transmitter output determined by a loop back measurement on the receiver input). The report may contain various counter values stored by the modem 130 (e.g., a count of parity errors, CRC errors, and checksum errors, a count of uncertain bits within message frames, a count of messages with amplitudes lower than the squelch limit, a count of messages with no errors (but with low amplitude), a count of protocol changes, and a count of amplitude failures on the transmitter output.

Various status variables also may be included in messages sent to the master device 110. For example, a communication error bit (set when a communication error occurs in the last message and reset when a message is received without communication error), a communication error history bit (e.g., set if one of the error counters is greater than zero), and a communications warning bit (set if a warning occurs in the last received message) may be included.

The master device may send control commands (e.g. a write command) to the slave device after receiving diagnostic reports or in response to a status bit. For example, the master device may command the slave device to reset the communication error counters. The master device also may adjust the receiver squelch limit and the transmitter output amplitude.

Figure 8:
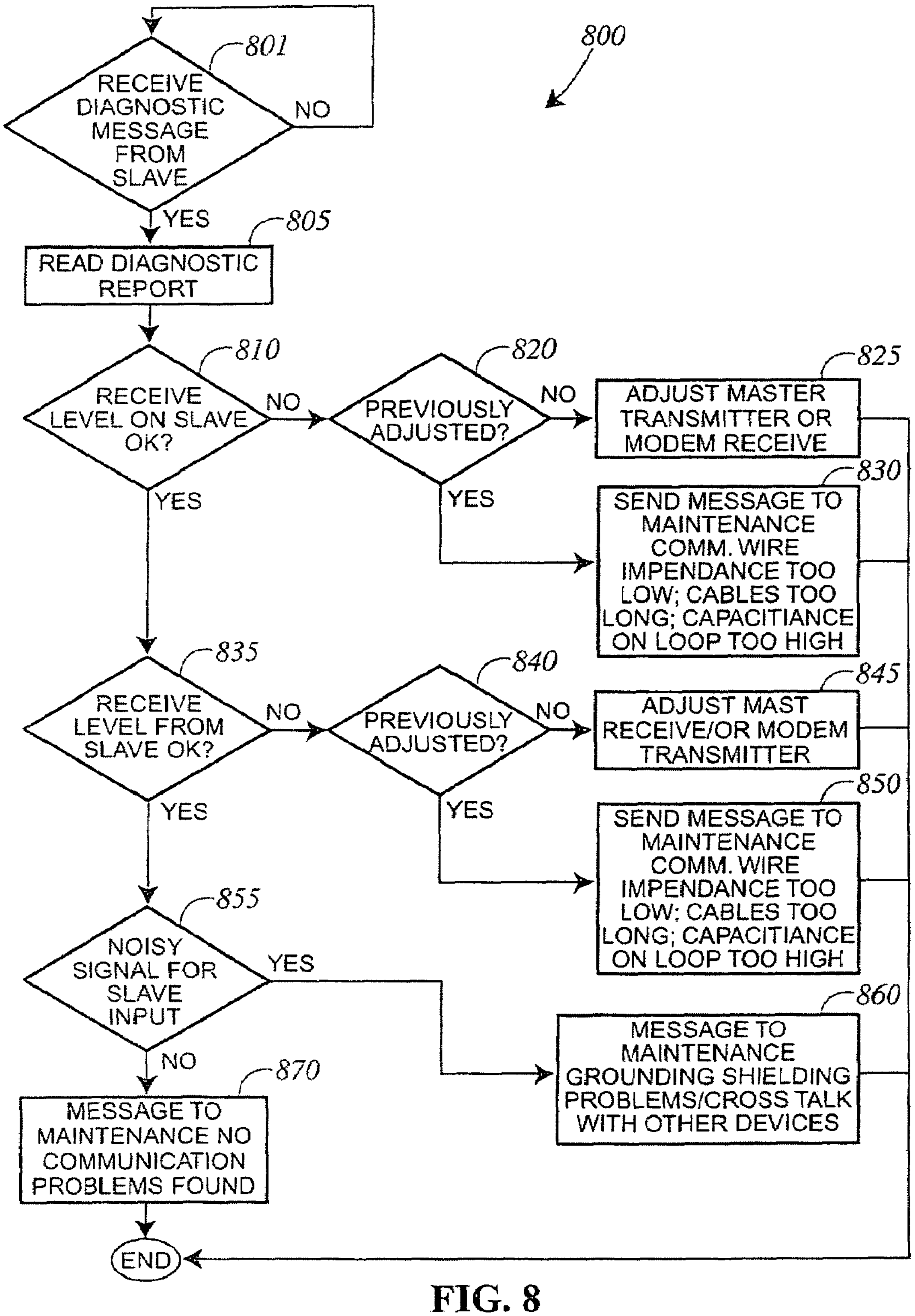

FIG. 8 shows a process 800 for interpreting the diagnostic report received from the slave device 111 or 112. Such a diagnostic report may be generated in response to a request from the master device 110 or by the processor 230 of the modem 130. The master device 110 monitors the carrier loop 101 for diagnostic reports (step 801). The master device also requests a readout of a diagnostic report from the slave device (805). After receiving a diagnostic report, master device 110 determines whether the receive level or amplitude of the modem 130 is acceptable (step 810). If the receive level is determined to be unacceptable, the master device 110 determines whether previous adjustments have been attempted (step 820). If no previous adjustments have been attempted (or if the number of attempts is acceptable), the master device 110 may increase its transmit level or instruct the modem 130 to adjust its receive level (step 825). If one or more previous adjustments have been made (step 820), the master device 110 may send a message to the control system network 125 indicating a problem exists on the carrier loop 101 (e.g., wire impedance is too high, loop cables are too long, and/or loop capacitance is too high) (step 830).

If the receive level on the modem 130 is acceptable (step 810), the master device 110 may determine whether the receive level from the modem 130 is acceptable (step 835). If the receive level from the modem 130 is determined to be unacceptable, the master device 110 determines whether previous adjustments have been attempted (step 840). If no previous adjustments have been attempted (or if the number of attempts is acceptable), the master device 110 may increase its receive level or instruct the modem 130 to adjust its transmit level (step 845). If one or more previous adjustments have been made (step 840), the master device 110 may send a message to the control system network 125 to indicate a problem exists on the carrier loop 125 (e.g., wire impedance is too high, loop cables are too long, and/or loop capacitance is too high) (step 850).

If the receive level of the modem 130 is acceptable (step 835), then the master device 110 determines whether there is unacceptable noise on the carrier loop 101 (e.g., by having the slave device measure the noise level when no messages are transmitted on the loop to determine the maximum noise amplitude) (Step 855). If unacceptable noise is present, the master device 110 sends a message to the control system 125 to indicate that noisy loop conditions exist (e.g., caused by grounding, shielding problems, or cross talk with other devices) (step 860).

If noise on the carrier loop 101 is determined to be acceptable (step 855), the master device 110 may send a message to the control system network 125 that no communications problems were determined (step 870).

Error Correction

In another implementation, when operating in the universal, intelligent mode, the modem 130 may provide error correction in conjunction with the parity bit checking by the processor 230. As previously described, the incoming demodulated digital signal is input to the variable speed buffer 210. The frequency of the signal is measured by demodulator 207. In addition, the A/D converter 225 may be used to measure the amplitude of the incoming signals. Each of these measurements may be input to the processor 230. Based on these measurements, the processor 230 may determine that a signal or portion of the signal deviates from an acceptable range. The processor 230 may mark any received bits that are questionable or have possible errors. For example, the transition of the amplitude for a particular bit may be too low to register as a change in frequency by the demodulator, and this may cause the demodulator 207 to output an incorrect bit. The transition/frequency between peak amplitudes may be too high to be registered, which may cause the demodulator 207 to incorrectly interpret the signal and output an incorrect bit.

The processor 230 may save a marker or an indication of any suspect bits. If a correct parity bit is received and the parity check indicates an error, the processor 230 may determine that the marked bit is in error and correct the value stored in the variable speed buffer 210 (e.g., by overwriting the variable).

Figure 9:
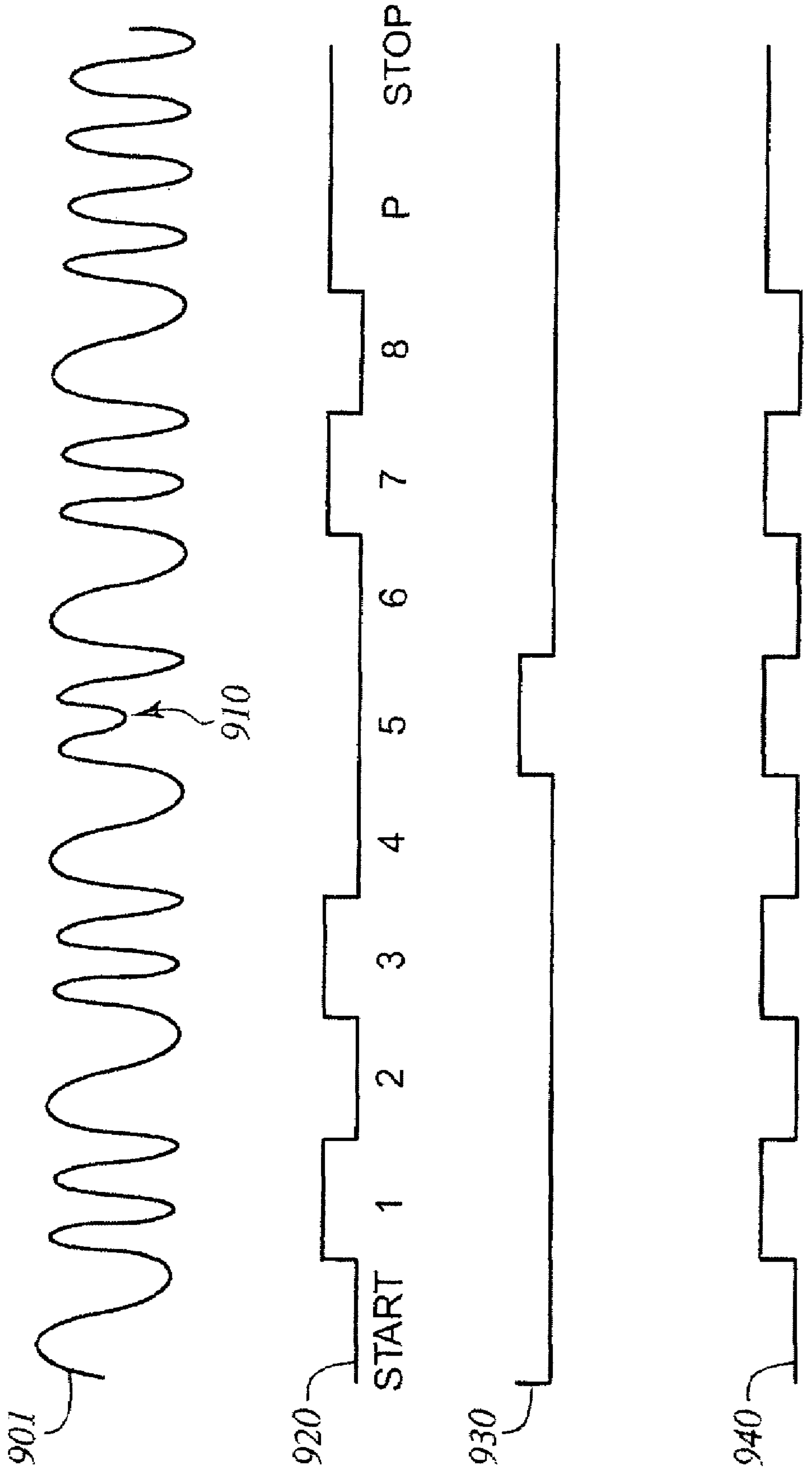
FIG. 9 is an example of error correction implemented by the modem of FIG. 2.

FIG. 9 illustrates an example of the error detection and correction that may be performed by the modem 130. An analog input signal 901 corresponding to a byte transmitted using the HART protocol (e.g., including 8 bits, one parity bit, and one stop bit) includes an error. As the signal is received, the amplitude of the signal transitions at bit 5. However, the change in amplitude 910 is too small for the demodulator 207 to detect as a change in frequency. As a result, the digital signal 920 output from the demodulator 207 includes an error at bit 5 (e.g., which is output from the demodulator 207 as a zero instead of a one). The processor 230 may detect the error because a parity check indicates odd parity (when the parity bit P indicates even parity). Because only a single bit 940 (i.e., bit 5) has been identified by the processor 230 as having a suspicious transition or error, and the error is detected using the parity check, the processor 230 is able to determine that the value of bit 5 is incorrect. The processor 230 may correct the error by overwriting the bit in the variable speed buffer 201 with the correct value to provided a corrected signal 940.

The processor 230 also may determine an error occurs even if a parity check indicates that there is no error. For example, if the processor 230 marks an even number of bits in a received message, an even parity will not generate an error. However, the processor may determine an error exists based on the number of indications determined for the message.

A number of implementations have been described. Nevertheless, it is understood that various modifications may be made. For example, the above described features, implementations, and methods, also may be implemented using wireless communications. A modem may be used to modulate a serial bit stream to provide physically modulated information (e.g., optical pulses) or radio frequency modulations (e.g., frequency shift keying, phase shift, or amplitude modulation). In addition, suitable results may be achieved if the steps of the disclosed techniques are performed in different order and/or if components in a disclosed system are combined in a different manner and/or replaced or supplemented by other components. Accordingly, other implementations are within the scope of the following claims.

What is claimed is:

1. A method of diagnosing errors in an industrial process control system comprising:

receiving, from a carrier loop using an industrial field device modem, a signal communicating a message that is related to an industrial process and that is sent by an industrial field device;

determining, using the industrial field device modem, whether an amplitude of the received signal is within a predetermined operating range;

accessing, using the industrial field device modem, a parity bit included in the message communicated in the received signal;

determining, using the industrial field device modem, whether the message communicated in the received signal has a parity error based on the parity bit;

generating, using the industrial field device modem, diagnostic data based on the determination of whether the amplitude of the received signal is within the predetermined operating range and the determination of whether the message communicated in the received signal has a parity error;

providing, from the industrial field device modem to an industrial process control device, the message communicated in the received signal; and providing, from the industrial field device modem to the industrial process control device, the generated diagnostic data.

2. The method of claim 1 wherein:

receiving, from the carrier loop using the industrial field device modem, the signal communicating the message sent by the industrial field device comprises receiving, from a fieldbus using the industrial field device modem, a signal communicating a message sent by at least one of an actuator, a sensor, or a process variable transmitter;

providing, from the industrial field device modem to the industrial process control device, the message communicated in the received signal comprises providing, from the industrial field device modem to a master device configured to control the at least one of the actuator, the sensor, or the process variable transmitter, the message communicated in the received signal; and providing, from the industrial field device modem to the industrial process control device, the generated diagnostic data comprises providing, from the industrial field device modem to the master device, the generated diagnostic data.

3. The method of claim 1 further comprising:

measuring, using the industrial field device modem, a noise level when no messages are being transmitted on the carrier loop, wherein generating, using the industrial field device modem, the diagnostic data further comprises generating, using the industrial field device modem, diagnostic data based on the measured noise level.

4. The method of claim 1 wherein generating, using the industrial field device modem, the diagnostic data comprises generating, using the industrial field device modem, a first diagnostic flag that indicates whether the amplitude of the received signal is within the predetermined operating range and a second diagnostic flag that indicates whether the message communicated in the received signal has a parity error.

5. The method of claim 1 wherein:

generating, using the industrial field device modem, the diagnostic data comprises storing the generated diagnostic data in an error log; and providing, from the industrial field device modem to the industrial process control device, the generated diagnostic data comprises providing, from the industrial field device modem to the industrial process control device, the error log.

6. The method of claim 1 wherein:

generating, using the industrial field device modem, the diagnostic data comprises generating a diagnostic report that includes at least one of a value of the amplitude of the received signal at a start of the message and an average amplitude of the received signal over the entire message; and providing, from the industrial field device modem to the industrial process control device, the generated diagnostic data comprises providing, from the industrial field device modem to the industrial process control device, the diagnostic report.

7. The method of claim 1 further comprising:

determining, using the industrial field device modem, whether the message communicated in the received signal has at least one of a CRC error, a checksum error, an uncertain bit within the message, and an amplitude lower than a squelch limit, wherein generating, using the industrial field device modem, the diagnostic data further comprises generating, using the industrial field device modem, diagnostic data based on the determination of whether the message communicated in the received signal has at least one of a CRC error, a checksum error, an uncertain bit within the message, and an amplitude lower than a squelch limit.

8. The method of claim 1 wherein:

generating, using the industrial field device modem, the diagnostic data further comprises generating, using the industrial field device modem, a diagnostic report that includes at least one of a count of parity errors, a count of CRC errors, a count of checksum errors, a count of uncertain bits within message frames, a count of messages with an amplitude lower than a squelch limit, a count of messages with no errors and relatively low amplitude, a count of protocol changes, and a count of transmitter failures on a transmitter output.

9. The method of claim 1 further comprising:

receiving, from the industrial process control device using the industrial field device modem, a control command generated by the industrial process control device in response to receiving and processing the generated diagnostic data; and performing, using the industrial field device modem, an operation based on the control command.

10. The method of claim 7 wherein performing, using the industrial field device modem, the operation based on the control command comprises adjusting a parameter of the industrial field device modem related to receiving messages over the carrier loop.

11. The method of claim 10 wherein adjusting the parameter of the industrial field device modem related to receiving messages over the carrier loop comprises adjusting at least one of the predetermined operating range and a squelch limit that indicates a minimum amplitude of signals that may be received from the carrier loop.

12. The method of claim 1 further comprising requesting, using the industrial field device modem, the industrial field device to retransmit the signal communicating the message based on at least one of a determination that the amplitude of the received signal is outside of the predetermined operating range and a determination that the message communicated in the received signal has a parity error.

13. The method of claim 1 wherein:

determining, using the industrial field device modem, whether the amplitude of the received signal is within the predetermined operating range comprises determining, using the industrial field device modem, whether the amplitude of the received signal is greater than a minimum amplitude threshold; and generating, using the industrial field device modem, the diagnostic data further comprises generating, using the industrial field device modem, diagnostic data based on the determination of whether the amplitude of the received signal is greater than the minimum amplitude threshold.

14. The method of claim 1 wherein:

receiving, from the carrier loop using the industrial field device modem, the signal communicating the message sent by the industrial field device comprises receiving, from the carrier loop using the industrial field device modem, the signal communicating the message at a first data rate; and providing, from the industrial field device modem to the industrial process control device, the message communicated in the received signal comprises providing, from the industrial field device modem to the industrial process control device, the message communicated in the received signal at a second data rate that is different than the first data rate.

15. The method of claim 14 furthering comprising:

demodulating, using the industrial field device modem, the received signal to derive the message from the received signal; and storing, using the industrial field device modem, the derived message in a first-in/first-out (FIFO) buffer device, wherein providing, from the industrial field device modem to the industrial process control device, the message communicated in the received signal at the second data rate that is different than the first data rate comprises providing the derived message stored in the FIFO buffer device from the FIFO buffer device at the second data rate.

16. An industrial field device modem comprising:

an interface configured to receive, from a carrier loop, a signal communicating a message that is related to an industrial process and that is sent by an industrial field device; and at least one processing device configured to:

determine whether an amplitude of the received signal is within a predetermined operating range;

access a parity bit included in the message communicated in the received signal;

determine whether the message communicated in the received signal has a parity error based on the parity bit;

generate diagnostic data based on the determination of whether the amplitude of the received signal is within the predetermined operating range and the determination of whether the message communicated in the received signal has a parity error;

provide, to an industrial process control device, the message communicated in the received signal; and provide, to the industrial process control device, the generated diagnostic data.

17. The industrial field device modem of claim 16 wherein the at least one processing device is further configured to:

measure a noise level when no messages are being transmitted on the carrier loop; and generate diagnostic data based on the measured noise level.

18. The industrial field device modem of claim 16 wherein, to generate the diagnostic data, the at least one processing device is configured to generate a first diagnostic flag that indicates whether the amplitude of the received signal is within the predetermined operating range and a second diagnostic flag that indicates whether the message communicated in the received signal has a parity error.

19. The industrial field device modem of claim 16 wherein the at least one processing device is further configured to:

receive, from the industrial process control device, a control command generated by the industrial process control device in response to receiving and processing the generated diagnostic data; and perform an operation based on the control command.

20. An industrial process control system comprising:

a carrier loop;

an industrial field device modem coupled to the carrier loop;

an industrial field device coupled to the carrier loop; and an industrial process control device, wherein:

the industrial field device is configured to send, over the carrier loop, a signal communicating a message related to an industrial process;

the industrial field device modem is configured to:

receive, from the carrier loop, the signal communicating the message related to the industrial process;

determine whether an amplitude of the received signal is within a predetermined operating range;

access a parity bit included in the message communicated in the received signal;

determine whether the message communicated in the received signal has a parity error based on the parity bit;

generate diagnostic data based on the determination of whether the amplitude of the received signal is within the predetermined operating range and the determination of whether the message communicated in the received signal has a parity error;

provide, to the industrial process control device, the message communicated in the received signal; and provide, to the industrial process control device, the generated diagnostic data; and the industrial process control device is configured to:

receive the message communicated in the received signal and the generated diagnostic data; and control operations of the industrial process control system based on the message communicated in the received signal and the generated diagnostic data.

* * * * *